United States Patent

[11] 3,581,779

| [72] | Inventor | Louis Gilbert Sylvia, Jr. Wilmington, Del. |
|---|---|---|
| [21] | Appl. No. | 127,492 |
| [22] | Filed | July 28, 1961 |
| [45] | Patented | June 1, 1971 |
| [73] | Assignee | E. I. du Pont de Nemours and Company Wilmington, Del. |

[54] LIGHTWEIGHT FLEXIBLE ROOFING LAMINATE AND ITS PREPARATION
12 Claims, 2 Drawing Figs.

[52] U.S. Cl. .................................................. 138/141,
52/309, 106/300, 156/282, 161/189
[51] Int. Cl. ....................................................... F16l 9/14,
B32b 31/12, E04d 1/20
[50] Field of Search ........................................... 154/51, H,
C Digest; 18/57 D; 156/282; 161/205, 189;
117/140, 158; 260/92.8; 106/299, 300, 312;
138/141, 32; 52/309

[56] References Cited
UNITED STATES PATENTS

| 1,956,091 | 4/1934 | Carson | 156/282 |
| 2,346,322 | 4/1944 | Nelson | 106/200 |
| 2,774,685 | 12/1956 | Carnegie | 117/76 |
| 2,779,387 | 1/1957 | Schairer | 117/4 |
| 3,015,582 | 1/1962 | Simison | 117/126 |
| 2,962,405 | 11/1960 | Morthland | 154/51 |
| 2,953,818 | 9/1960 | Barton | 18/57 |
| 2,673,826 | 3/1954 | Ness | 117/138.8 |
| 2,891,279 | 6/1959 | Neuman | 156/282 |
| 2,434,541 | 1/1948 | Bierer | 156/80 |
| 2,861,022 | 11/1958 | Lundsager | 161/214 |

*Primary Examiner*—Alfred C. Perham
*Attorney*—Robert W. Black

CLAIM: 10. A wrapped conduit comprising an inner continuous length of pipe, a layer of an insulation material and an outer covering of an oriented, opaque, surface-receptive polyvinyl fluoride film laminated to a water-resistant, resilient, flexible backing material, said backing material maintained next to said insulation material.

PIGMENTED, OPAQUE POLYVINYL FLUORIDE FILM
ADHESIVE
WATER-PROOF RESILIENT BACKING MATERIAL

INVENTOR
LOUIS GILBERT SYLVIA, JR.

BY *Claude L. Beaudoin*

ATTORNEY

LIGHTWEIGHT FLEXIBLE ROOFING LAMINATE AND ITS PREPARATION

This invention relates to a laminated article. More particularly this invention relates to a laminated roof-surfacing material comprising opaque polyvinyl fluoride film and a water-resistant, resilient, flexible backing material and to a process for its preparation.

The majority of modern flat or low-pitched roofs in the United States are surfaced with a waterproof covering commonly called a built-up roof. This covering consists of alternate layers of membranes and bituminous coatings with the latter serving as the waterproofing agent and adhesive while the membranes stabilize the bitumen and reinforce the total structure. The completed system, in effect, becomes a seamless piece of flexible, waterproofed material, custom built to fit the roof. The prime purpose of roofing is to prevent the penetration of water into the building and this is the function of the bitumen since the membranes are intrinsically water absorbing and usually will deteriorate with moisture absorption. Therefore, the top covering of bitumen can be considered the most important single element in the total structure although multiple layers will extend the service life of the roof by providing a series of barriers to degradation and erosion.

Deterioration of the top cover of bitumen results from oxidation catalyzed and accelerated by solar radiation. To retard this deterioration, a top surfacing of material such as gravel or similar mineral granules is normally placed on the bitumen to protect it from exposure to ultraviolet light. This top surfacing adds considerable weight and cost to the roof covering and makes maintenance and removal more difficult.

It is an object of this invention to provide a laminated article. A further object of this invention is to provide a laminated roof surfacing material comprising opaque polyvinyl fluoride film and a water-resistant, resilient, flexible backing material and a process for its preparation. A still further object of this invention is to provide a lightweight laminated roof surfacing material of outstanding weatherability, mechanical toughness and chemical inertness. These and other objects will appear hereinafter.

These and other objects are accomplished by an article comprising opaque, surface receptive polyvinyl fluoride film laminated to a water-resistant, resilient, flexible backing material.

Figure 1:
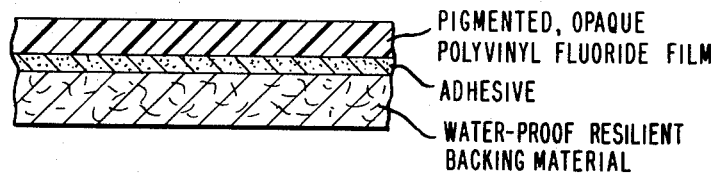
FIG. 1 is a cross-sectional view of the product produced by this invention.
Figure 2:
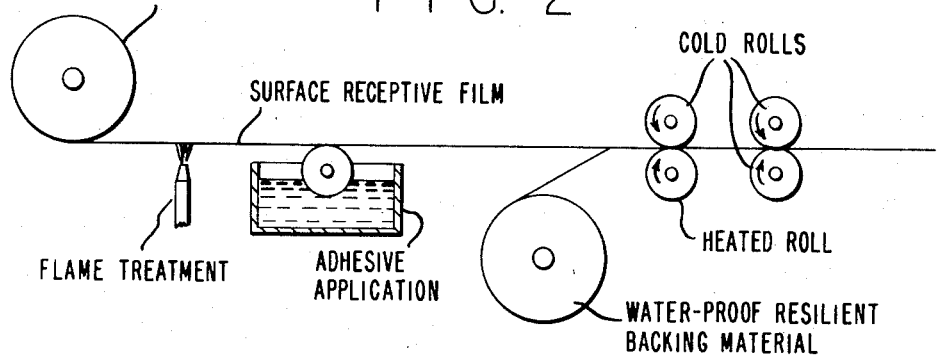
FIG. 2 is a schematic showing of the process embodying the present invention.

Opaque, surface-receptive polyvinyl fluoride film is mechanically tough and substantially chemically inert film which exhibits outstanding weatherability, is impermeable to water and is opaque to ultraviolet light. A laminate of this film and a water-resistant, resilient, flexible backing material makes an excellent roof-surfacing material which can be applied using methods similar to those currently used for installing built-up roofs. The water-resistant, resilient, flexible backing material provides the necessary handling characteristics, cushioning effect and adhereability to roof substrates while protected from the degrading effects of ultraviolet light and water penetration by the impermeable polyvinyl fluoride film. Additional benefits of reduced dead weight, reduced solar heat load by using a white or light-colored surfacing material, lower fuel contribution in case of fire and ease in application and maintenance also result.

Polyvinyl fluoride films useful for purposes of this invention can be made by a variety of means. A particularly useful method for making polyvinyl fluoride films consists of the steps of feeding a latent solvent/particulate polyvinyl fluoride mixture to a heated extruder which is connected to a slotted casing hopper, from whence a tough, coalesced gel polyvinyl fluoride film containing latent solvent is continuously extruded. This latent solvent-containing film is then stretched first longitudinally over heated rolls and then transversely in a tenter frame, in which it is held in restraint while the remaining latent solvent is volatilized. These extrusion and stretching procedures are described in detail in U.S. Pat. No. 2,953,818 issued in the name of Lester Ray Bartron and copending U.S. Pat. application Ser. No. 801,441, filed Mar. 24, 1958, in the names of Robert Smith Prengle and Robert Laurence Richards, Jr. and assigned to the assignee of the present invention. Unoriented polyvinyl fluoride film is also useful in this invention.

The polyvinyl fluoride film must also be opaque. This is accomplished by incorporating various pigments in the polyvinyl fluoride during mixing of the feed prior to extrusion. The polyvinyl fluoride film used in the preferred embodiment of this invention contains about 18 percent titanium dioxide, based on the weight of the polyvinyl fluoride polymer, incorporated in the polyvinyl fluoride/latent solvent mixture fed to the extruder. Of course, other opaque pigments of any desired color can be used to make the polyvinyl fluoride film opaque to ultraviolet light. Such pigments would include lampblack, chrome yellow, cadmium selenide red, phthalocyanine blue, phthalocyanine green and blends of these pigments. These pigments can be incorporated into the polyvinyl fluoride film in amounts of up to about 25 to 30 percent, based on the weight of the polyvinyl fluoride polymer. Pigment concentration over about 30 percent tends to make the film chalky. The minimum amount of pigment that can be employed depends upon the pigment used but it must be sufficient to render the film opaque to ultraviolet light.

Another critical feature of this invention is that the polyvinyl fluoride film must be surface receptive, i.e., at least one of its surfaces should contain functional groups selected from one or more of the group consisting of ethylenic unsaturation and hydroxyl, carboxyl, amino and amido groups. This means that the surface is receptive to adhesive, i.e., the adhesive is permitted to be bound firmly to the film. Polyvinyl fluoride films can be rendered surface receptive and thereby suitable for use in the process of this invention by any of a number of surface treatments. For example (1) they can be passed through a stainless steel lined treating chamber containing a gaseous mixture consisting of from about 10 percent to 90 percent boron trifluoride maintained at a temperature in the range of from about 20° C. to 75° C. for a period of from about 3 to 30 seconds, followed by either (a) washing in an ammonium hydroxide solution followed by a water-wash and drying in air or (b) a water-wash followed by drying in air; or (c) heating for a brief period at temperatures ranging between about 100° C. and 150° C.; or (2) they can be immersed in or contacted with concentrated sulfuric acid, fuming sulfuric acid or sulfur trioxide, for brief periods of time ranging from about 2 seconds to about 1 minute, followed by a water-wash and then air drying. This can be done at temperatures ranging from about 25° C. to as high as 95° C. It ill be understood, of course, that the exposure time necessary to render the film surface receptive will decrease as either the concentration of the acid or the temperature of the solution is increased; or (3) they can be immersed briefly in boron trifluorideetherate complexes followed by either a water-wash or an ether washer followed by heating in air to dry. Such immersions can vary widely in time and will depend somewhat upon the temperature at which the complex is maintained; or (4) they can be flame treated by passing at rates of from 100 to 250 feet per minute over and in contact with a chilled metal drum while the surface away from the drum passes through the flame of a gas burner fueled with a 1:20 propane:air mixture; or (5) they can be subjected to a high frequency spark discharge in an atmosphere comprising chiefly nitrogen by passing at rates of from 10 to 300 feet per minute over and in contact with a grounded metal drum while the surface away from the drum passes under and in close proximity to (one thirty-seconds inch to one-half inch) a rod or bar serving as the electrode, said electrode being connected to a source of high frequency alternating voltage.

The water-resistant, resilient flexible backing material useful for purposes of this invention includes such materials as asphalt-saturated felt, asphalt-impregnated nonwoven fiberglass mat, asphalt-saturated rag felt, neoprene-impregnated asbestos felt, rubber sheeting and the like.

A process for preparing the laminated roof-surfacing material of this invention comprises coating one surface of an unoriented or biaxially oriented, opaque, surface-receptive polyvinyl fluoride film with an adhesive composition, coating one surface of a water-resistant, resilient, flexible backing material with the same adhesive composition, passing the film and backing material with the adhesive-coated surfaces together between nip rolls, the nip roll next to the film being a cold roll and the nip roll next to the backing material being a heated roll and passing the resulting laminate between cold nip rolls.

The preferred adhesives are butadiene-acrylonitrile copolymer adhesives similar to those described in U.S. Pat. No. 2,673,826, to which have been added a curing agent.

This invention gives an excellent roof-surfacing material and pipe insulation wrapping material with outstanding handling properties and at a minimum weight. In addition to the above advantages, the material is mechanically tough, chemically inert and exhibits outstanding weatherability because of the opaque polyvinyl fluoride film which screens out destructive ultraviolet light.

The invention can be more fully understood by referring to the following examples.

EXAMPLE I

Biaxially oriented, opaque, surface-receptive polyvinyl fluoride film, 0.004 inch thick, and containing 18 percent titanium dioxide, was laminated to 15 pounds per square (100 square feet) asphalt-saturated asbestos felt. The surface of the film to be laminated to the felt was coated with a layer of a butadiene-acrylonitrile copolymer adhesive, similar to the adhesive described in example I in U.S. Pat. No. 2,673,826, to which had been added 10 (based on the weight of the solids in the adhesive) of a trimethylol propane toluene diisocyanate reaction product, approximately 0.0008 inch thick when dry, and was completely dried at 150° F. The surface of the felt to be laminated to the film was also coated with a layer of the same adhesive composition, approximately 0.0008 inch thick when dry, and was dried until the adhesive coating became tacky. The film and felt were then laminated together by passing them between nip rolls, the roll next to the film being cold and the roll next to the felt being 10° F. The heated roll served to vaporize the remaining solvent in the tacky adhesive coating on the felt which, in turn, activated the dry adhesive on the film surface as they came together at the nip. The laminate was then passed between chilled nip rolls and wound up. An excellent laminate was obtained.

A portion of the laminate was cemented to a roof substrate with hot-melt asphalt, the joints between adjacent strips of laminate being sealed with 3 inches wide tapes of the same polyvinyl fluoride film used in the laminate. These tapes had been precoated with a nitrile-rubber based adhesive. The area to be covered by the tapes was first brush-coated with the same adhesive and the tapes applied after the adhesive had become tacky. This installation has given excellent service.

Another portion of the laminate was cemented to a roof substrate with a cold-setting asphaltic cement, again sealing the joints between adjacent strips with the same tape and in the same manner mentioned in the previous paragraph. This roofing installation has also given excellent service.

EXAMPLE II

Biaxially oriented, opaque (containing 18 percent titanium dioxide), surface-receptive polyvinyl fluoride film, 0.004 inch thick, was laminated to nonwoven fiberglass mat, approximately 0.025 inch thick, impregnated with an asphaltic aqueous emulsion (60 percent solids), by passing them together between nip rolls to remove excess emulsion and also to force the emulsion to the other side of the mat which then adhered the mat to the film. The water emulsion was removed by drying at 150° F. and the laminate again passed between cold nip rolls before being wound up.

A laminate of this example was cemented to a roof which was covered with asphalt-impregnated vegetable fiberboard insulation using a cold-setting asphalt cement. Joints were sealed with 4 inches wide tapes of the same polyvinyl fluoride film used to make the laminate, using a field-applied epoxy adhesive. This installation has given very satisfactory service.

EXAMPLE III

Biaxially oriented, opaque (containing 18 percent titanium dioxide), surface-receptive polyvinyl fluoride film, 0.004 inch thick, was laminated to 15 pounds per square (100 square feet) asphalt-saturated rag felt. The laminating surface of the film was coated with a layer of a butadiene-acrylonitrile copolymer adhesive, similar to the adhesive described in Example IV in U.S. Pat. No. 2,673,826, to which had been added 10 percent (based on the weight of the solids in the adhesive) of a trimethylol propane toluene diisocyanate reaction product, approximately 0.0008 inch thick when dry, and was completely dried at 150° F. The laminating surface of the asphalt-saturated rag felt was also coated with a layer of the same adhesive composition, approximately 0.0008 inch thick when dry, and was dried until the adhesive coating became tacky. Film and felt were then laminated together by passing them between nip rolls, the roll next to the film being cold and the roll next to the felt being at 150° F. The heated roll vaporized the solvent remaining in the tacky adhesive, thereby activating the dry adhesive on the film surface as the came together at the nip. The laminate was then passed between chilled nip rolls and wound up. An excellent laminate resulted.

A portion of the laminate of this example was cemented to a roof substrate with hot-melt asphalt and another portion of the laminate was cemented with a cold-setting asphaltic cement. The joints between the strips were sealed with 3 inches wide polyvinyl fluoride film tape as in Example I. This installation has given very satisfactory service.

EXAMPLE IV

Biaxially oriented, opaque (containing 18percent titanium dioxide), surface-receptive polyvinyl fluoride film, 0.001 inch thick, was laminated to 12 pounds per square (100 square feet) neoprene-impregnated asbestos felt. The laminating surface of the film was coated with a layer of a butadiene-acrylonitrile copolymer adhesive to which had been added 10 percent (based on the eight of the solids in the adhesive) of a trimethylol propane toluene diisocyanate reaction product, approximately 0.0008 inch thick when dry, and was completely dried at 150° F. The laminating surface of the neoprene-impregnated asbestos felt was also coated with a layer of the same adhesive composition, approximately 0.0008 inch thick when dry, and was dried until the adhesive coating became tacky. The film and felt were then laminated together by passing them between nip rolls, the roll next to the film being cold and the roll next to the felt being at 150° F. The heated roll vaporized the solvent remaining in the tacky adhesive, thereby activating the dry adhesive on the film surface as they came together at the nip. The laminate was then passed between chilled nip rolls and wound up. An excellent laminate resulted.

Polyvinyl fluoride films 0.001 inch, 0.002 inch and 0.004 inch thick have also been laminated to neoprene-impregnated asbestos felt in the same manner, with very satisfactory laminates being obtained.

It also has been found possible to coat only one surface with the same adhesive composition used above and them laminate the two sheets between a cold rubber backing roll and a not nip roll which is next to the felt.

EXAMPLE V

Biaxially oriented, opaque (containing 18 percent titanium dioxide), surface-receptive polyvinyl fluoride film, 0.001 inch thick, was laminated to 15 pounds per square (100 square feet) asphaltgsaturated asbestos felt using the same method described in Example I. The resulting laminate was then wrapped around conventional pipe insulation such as asbestos and fastened by conventional means. This polyvinyl fluoride film/asbestos felt laminate gave excellent protection against the weather for the pipe insulation. Other continuous length conduits of any shape made from any materials such as steel, copper, other metals or plastic and covered with insulation material can be wrapped in the laminates of this invention to give excellent protection against the weather.

What I claim is:

1. A roof-surfacing material comprising an oriented polyvinyl fluoride film containing an amount of pigment within the range sufficient to render said film opaque to ultraviolet light and about 30 percent and at least one surface of which contains functional groups selected from the group consisting of ethylenic unsaturation and hydroxyl, carboxyl, amino and amido groups laminated to a water-resistant, resilient, flexible backing material, said backing material laminated to the surface which contains the functional groups.

2. A roof-surfacing material comprising a biaxially oriented polyvinyl fluoride film containing about 18 percent titanium dioxide and at least one surface of which contains functional groups selected from the group consisting of ethylenic unsaturation and hydroxyl, carboxyl, amino and amido groups laminated to a water-resistant, resilient, flexible backing material said backing material laminated to the surface which contains the functional groups.

3. The article of claim 2 in which the water-resistant, resilient, flexible backing material is a layer of an asphalt-saturated asbestos felt.

4. The article of claim 2 in which the water-resistant, resilient, flexible backing material is a layer of an asphalt-impregnated, nonwoven fiber glass mat.

5. The article of claim 2 in which the water-resistant resilient, flexible backing material is a layer of an asphalt-saturated rag felt.

6. The article of claim 2 in which the water-resistant, resilient, flexible backing material is a layer of a neoprene-impregnated asbestos felt.

7. A process for preparing a laminate comprising: coating one surface of a surface-receptive polyvinyl fluoride film opaque to ultra-violet light with an adhesive composition, coating one surface of a water-resistant, resilient, flexible backing material with the same adhesive composition, passing said film and said backing material, the adhesive coated surfaces together, between nip rolls, the nip roll next to the film being a cold roll and the nip roll next to the backing material being a heated roll and passing the resulting laminate between cold nip rolls.

8. A process for preparing a roofing laminate comprising: coating one surface of a biaxially oriented, surface-receptive polyvinyl fluoride film containing about 18 percent titanium dioxide with an adhesive composition, coating one surface of a neoprene-impregnated asbestos felt with the same adhesive composition, passing said film and said felt, the adhesive coated surfaces together, between nip rolls, the nip roll next to the film being a cold roll and the nip roll next to the felt maintained at a temperature of about 150 F. and passing the resulting laminate between cold nip rolls.

9. A process for preparing a roofing laminate comprising: coating one surface of a neoprene-impregnated asbestos felt with an adhesive composition, passing said felt with a biaxially oriented, surface receptive polyvinyl fluoride film containing about 18 percent titanium dioxide adhered to its adhesived surface between nip rolls, the nip roll next to the film being a cold roll and the nip roll next to the felt maintained at a temperature of about 150° F. and passing the resulting laminate between cold nip rolls.

10. A wrapped conduit comprising an inner continuous length of pipe, a layer of an insulation material and an outer covering of an oriented, opaque, surface-receptive polyvinyl fluoride film laminated to a water-resistant, resilient, flexible backing material, said backing material maintained next to said insulation material.

11. A weather and fire-resistant roofing material comprising a polyvinyl fluoride plastic film adhesively laminated to an asbestos felt backing by means of a thermosetting elastomeric adhesive, said asbestos felt backing impregnated with a nonflammable elastomeric binder, and said plastic film being substantially opaque to protect the adhesive bond thereof to the backing from photochemical degradation.

12. A weather- and fire-resistant material for covering and protecting the exposed surfaces of structures comprising a laminate of polyvinyl fluoride plastic film secured by an elastomeric adhesive to an asbestos felt backing impregnated with a nonflammable elastomeric binder, said plastic film being substantially opaque to protect the adhesive bond thereof to the backing from photochemical degradation.

PO-1050
(5/69)

UNITED STATES PATENT OFFICE
CERTIFICATE OF CORRECTION

Patent No. 3,581,779    Dated June 1, 1971

Inventor(s)    Louis Gilbert Sylvia, Jr.

It is certified that error appears in the above-identified patent and that said Letters Patent are hereby corrected as shown below:

```
Column 2, line 53, "ill" should read --will--.
Column 2, line 58, "washer" should read -- wash --.
Column 3, line 37, "10" should read --10 percent--.
Column 3, line 47, "10°F." should read --150°F.--.
Column 4, line 32, "the" should read -- they--; (third occurrence)
Column 4, line 49, "eight" should read --weight--.
Column 4, line 70, "them" should read --then--.
Column 4, line 71, "not" should read --hot--.
Column 5, line 2, "asphaltgsaturated" should read
--asphalt-saturated--.
```

Signed and sealed this 9th day of May 1972.

(SEAL)
Attest:

EDWARD M. FLETCHER, JR.                ROBERT GOTTSCHALK
Attesting Officer                      Commissioner of Patents